March 15, 1949.  R. D. McCOY  2,464,249

ELECTRICAL FOLLOW-UP SYSTEM

Filed July 19, 1943

INVENTOR
RAWLEY D. McCOY
BY
*Herbert H. Thompson*
HIS ATTORNEY.

Patented Mar. 15, 1949

2,464,249

UNITED STATES PATENT OFFICE 2,464,249

ELECTRICAL FOLLOW-UP SYSTEM

Rawley D. McCoy, Bronxville, N. Y., assignor to The Sperry Corporation, a corporation of Delaware Application July 19, 1943, Serial No. 495,297

8 Claims. (Cl. 250—27)

My invention relates to amplifiers for use in connection with electrical servo or follow-up systems, which systems comprise means for positioning or moving a controlled object in accordance with the position or changes in position of some controlling object. My invention also relates to an amplifier which is particularly adapted for use with a gyroscopic compass.

In gyroscopic compasses, for example, the north-seeking gyro element is acted upon by a relatively weak directive force, and therefore it is not desirable to employ the vertical ring thereof, which is positioned in azimuth by the gyro, to directly operate power-consuming devices or transmitters for remote repeaters or remote compass position indicators. In view of this fact, so-called "phantom" ring is used which is driven or positioned by independent power means in such a manner that it is substantially continuously positioned in correspondence with the position of the vertical ring of the gyroscope. The system which is used in controlling the independent power means includes a means for generating a signal impulse when disagreement in the positions of the vertical ring and the "phantom" ring occurs, and phase-sensitive amplifying means responsive to the signal. In the present invention, the system also includes amplifying means for raising the output to a power level sufficiently high that it may be used in operating the independent power means or an electric motor which serves to drive or position the "phantom" element.

Although, in the following, I have described my invention in connection with its use as an amplifier and control system for a gyroscopic compass, it will be understood that the circuit of the present invention may be employed with servo or follow-up systems of other types and characters. Hence, it will be further understood that the following description will serve in the main for exemplary purposes and also to describe the preferred embodiment of my invention in connection with the use for which it is particularly adapted.

It is a primary object of my invention to provide a control circuit which functions to provide a rate signal or a signal proportional to the rate of change of the position of a controlling object relative to a controlled object together with a displacement signal or a signal proportional to the magnitude of displacement of the two objects for stabilizing a servomotor, preferably an electric servo.

Another object resides in providing a control circuit for a follow-up system in which the rate signal is derived from the cathode circuit of the electron tubes embodied therein.

Another object resides in providing a control circuit of the above character which also includes means for deriving, in addition to a first time derivative signal, a second derivative signal with respect to time, whereby the output of the circuit comprises components proportional to displacement of the reference and follow-up element, a first derivative or the rate at which such displacement is occurring, and a second derivative or component proportional to an acceleration of such displacement.

Still another object resides in providing a control amplifier circuit of the above characters which is designed directly to supply power to an electric servomotor connected therewith.

With the foregoing and still other objects in view, my invention includes the novel arrangement and relative association of elements described below and illustrated in the accompanying drawings, in which—

Figure 1:
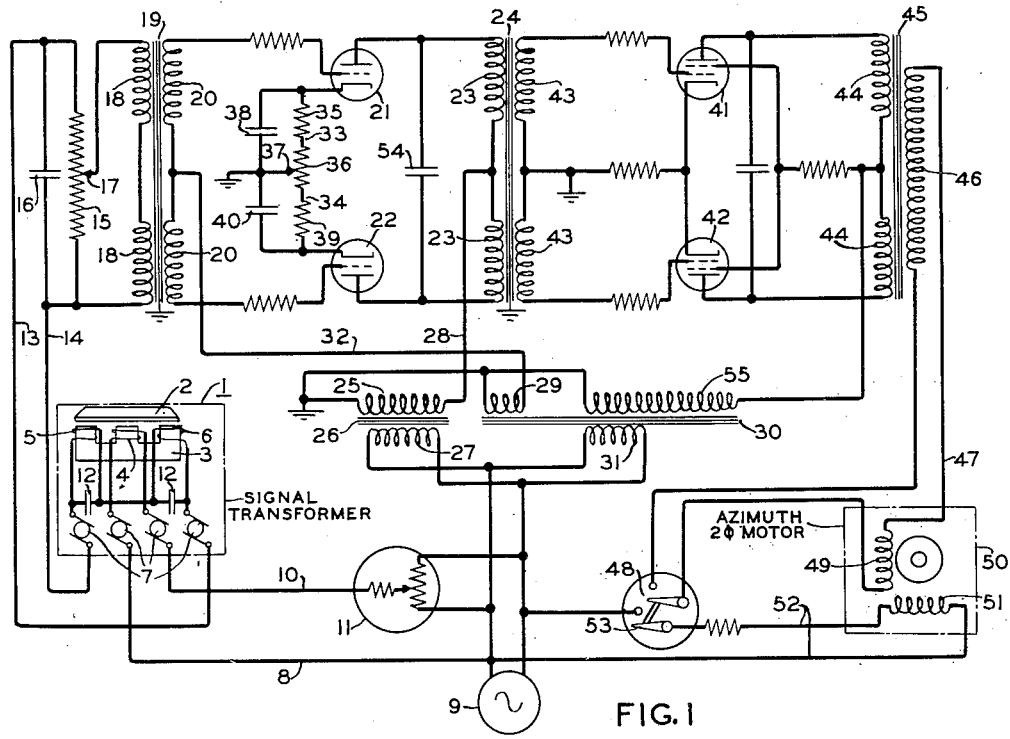
Fig. 1 is a wiring diagram of the preferred embodiment of my invention.

As hereinabove indicated, I will in the following describe my invention in connection with its use as a follow-up system for a gyroscopic compass.

A signal transformer indicated generally at 1 is employed to provide a signal when relative displacement between the vertical and "phantom" rings of a gyroscopic compass occurs, and the signal transformer is of such a character that the signal voltage output therefrom will have a direction or phase sense depending upon the direction in which relative displacement takes place. In the embodiment illustrated, the transformer 1 comprises an armature 2 and an E-shaped core 3, one of which is mounted to move with the vertical ring and the other of which is positioned with the "phantom" ring. The central leg of core 3 is provided with an exciting winding 4 while the outer legs thereof are provided with secondary windings 5 and 6. Connections to the respective windings are effected through slip rings and brushes 7. The energizing winding 4 is connected through one pair of slip rings and brushes 7, through conductor 8 to one side of a suitable source of alternating current 9 and through conductor 10 to potentiometer 11, connected across the source 9, providing control of the potential across the energizing winding 4.

The operation of the signal transformer is as follows. Assuming that armature 2 is equally spaced from the outer core legs of core 3, flux produced in the central leg thereof by the exciting winding 4 will divide equally through the armature 2, returning through the outer legs of the core 3. Equal potentials will therefore be generated in the secondary coils 5 and 6. However, if the armature 2 is moved relative to the core 3 and nearer to a first outer leg and away from the second outer leg, more flux will pass through the first core leg than through the second, and a higher potential will be induced in the coil associated with the first leg than in the coil associated with the second.

Tuning condensers 12 may be connected across the secondary coils 5 and 6, one end of said coils being connected together and the other ends thereof being connected through conductors 13 and 14 across a potentiometer 15. These coils are connected in series opposition, and a potential equal to the difference between the voltages induced in the secondary coils 5 and 6 will appear across the potentiometer 15. A condenser 16 may be connected across the potentiometer to filter out undesired harmonics. With the foregoing arrangement, when the armature 2 and core 3 are relatively displaced in one direction, a potential having one phase sense will appear across the potentiometer 15, and when relative displacement between the armature 2 and core 3 occurs in the opposite direction, a potential of opposite phase sense will appear across the potentiometer.

Potentiometer 15, through the medium of the contact 17 thereof, serves to control the magnitude of the signal potentials supplied to the primary coils 18 of a coupling transformer 19. The secondary coils 20 of transformer 19 are connected to supply a signal voltage in phase opposition to the grids of electron tubes 21 and 22. The primary windings 23 of a coupling transformer 24 are connected together and across the plates of the tubes 21 and 22 so that the outputs from the plates of tubes 21 and 22 will appear in bucking relation in the primary of the transformer 24. The plate voltage for the tubes 21 and 22 is derived from the secondary 25 of the transformer 26, the primary 27 of which is connected across the source of alternating current 9. One end of transformer secondary 25 is connected through conductor 28 to supply plate potentials in phase agreement to the plates of tubes 21 and 22, and the other end is grounded as shown.

Similarly, an alternating grid biasing potential is supplied to the grids or control electrodes of these tubes from the secondary winding 29 of a transformer 30, the primary 31 of which is also connected across the source of alternating current 9. One end of winding 29 is grounded, and the other end is connected through conductor 32 to the common connection between the two secondary coils 20 of transformer 19. The grid biasing potential derived from secondary winding 29 is in phase with the plate potentials supplied to the plates of the tubes and renders the grids more positive when the plate voltage is positive, and the provision of a grid-biasing potential is desirable in order that the tubes may operate for quiescent current values on the linear portion of their tube characteristic curves when resistance of relatively high magnitude, hereinafter described, are connected in the cathode circuits thereof.

Since the plate potentials supplied to the plates of tubes 21 and 22 are in phase and the signal voltages supplied to the grids of these tubes will have a phase sense depending upon the direction of relative movement of armature 2 and core 3 of the signal transformer, when movement of the armature and core from a balanced relationship occurs, the plate output from tube 21 or tube 22 will increase while that of the other tube will decrease depending upon the direction of such movement. Ordinarily, when the armature 2 of the signal transformer is equally spaced from the outer core legs of the core 3, the plate outputs of tubes 21 and 22 will be substantially equal but in opposite phase sense and cancel each other in the primary of the transformer 24. With the above-described arrangement, tubes 21 and 22 are phase-sensitive, and the magnitude and direction of the resultant voltage applied to the primary of transformer 24 will depend upon the magnitude and direction of the relative movement of the armature 2 and core 3 of the signal transformer.

In the foregoing, I have described circuit elements which will provide a displacement signal only in the plate circuits of the two electron tubes. In order that these tubes will provide a plate output which also includes a component proportional to rate of change of relative position of the armature 2 and core 3 of the signal transformer, I provide the novel rate-taking circuits indicated generally at 33 and 34, one of which is connected in the cathode circuit of one tube and the other in the cathode circuit of the other tube. These rate circuits comprise resistance and capacitance connected in parallel and between the cathode of the tubes and ground. The circuit 33 includes the resistor 35 and some portion of the balancing resistor or balancing potentiometer 36, the sliding contact 37 of which is connected to ground. The circuit also includes the condenser 38 which is connected across the resistor 35 and part of resistor 36 between the cathode of tube 21 and ground. Likewise, rate circuit 34 includes resistor 39 and a portion of resistor 36 across which is connected condenser 40. The resistor 36 is arranged with a sliding contact 37 for balancing purposes. A single condenser may be substituted for condensers 38 and 40 and connected across the resistors 35, 36 and 39.

The value of the resistance which I employ in the cathode circuit in order to derive a rate signal must be of a sufficiently high order of magnitude as to provide degeneration for the tube with which it is associated. In practice, I find that the cathode resistance should be of the order of about 10,000 to 20,000 ohms or of a resistance value of the order of magnitude of the impedance in the plate circuit of the tube with which it is associated. The condenser 38 or 40 should have a capacitance of about one microfarad. The resistance in the cathode circuit causes degeneration with a change in signal voltage applied to the grid of the tube, and the condenser in parallel therewith causes the degeneration to be delayed. From another viewpoint, the capacitance resistance network in the cathode circuit of the tubes may be considered to function as a phase-shifting network. In either event, the output from the plate of the tube will contain a component proportional to displacement and also a component proportional to the rate or velocity at which such displacement takes place.

The operation of the portion of the circuit above-described is as follows. Assuming that the outer legs of the core 3 and the armature 2 of the signal transformer are equally spaced, quiescent currents will flow from the plates of electron tubes 21 and 22 in bucking relationship to the primary of transformer 24. Assume, however, that a large error is present which is decreasing toward zero error, or, in other words, that a comparatively large error angle exists between the vertical and "phantom" rings of the compass but that the "phantom" ring is approaching the position of the vertical ring. For this condition, we may assume that the plate current from tube 21 exceeds its quiescent value and that the plate current from tube 22 is less than its quiescent value. The voltage drop across the resistance and capacitance in the cathode circuit of tube 21 will be greater than the voltage drop across the resistance and capacitance in the cathode circuit of tube 22. The output current of each tube is proportional to the algebraic sum of the error voltage or signal voltage supplied to the grid of the tube and its self-bias voltage. Hence, as the error or signal voltage decreases in magnitude, under the above assumption, the output of the tube will be decreased faster because the condenser in the cathode circuit will delay changes in the self-bias voltage across the resistance in the cathode circuit. Under the above assumed conditions and due to the delaying operation of the rate circuit, when the error signal reduces to a zero value, the self-bias of tube 21 will still be greater than its quiescent value while the self-bias voltage of tube 22 will be less than its quiescent value. Hence, the resultant output voltage from the plates of the two tubes will be in a phase sense which is determined by tube 22 or in a phase sense which is opposite to that which it originally had under the foregoing assumed conditions. Conversely, a signal voltage of increasing magnitude will supply a rate component which is caused by the delayed degeneration of the tubes as above described, and the plate output of the tube will increase faster in magnitude than the signal voltage applied to the grid thereof.

The outputs from the plates of the electron tubes 21 and 22 are coupled through transformer 24 to the grids of the electron tubes 41 and 42 which are comprised in an amplifier stage. The secondary windings 43 of transformer 24 are connected to supply signal voltage in phase opposition to the grids of tubes 41 and 42, as shown, while the plates thereof are connected to supply the outputs thereof in bucking relationship in the primary coils 44 of transformer 45. The secondary 46 of transformer 45 is connected through conductors 47 and through switch 48 to one phase 49 of the two-phase motor 50. The other phase 51 of motor 50 is connected through conductors 52 and switch 53 to the source of alternating current 9. A condenser may be employed and may be substituted for the resistor in series with motor winding 51 to provide the proper phase relation of the currents in the fixed and control field windings 51 and 49 of the motor 50.

In the latter described portion of my control circuit, an additional rate is derived from the transformer 24 which is due to direct current in the primary 23 thereof. The direct current in the primary 23 is proportional to the effective alternating current therein, and the ratio of alternating to direct current in the primaries can be controlled by varying the value of the condenser 54 which is connected across the plates of tubes 21 and 22 and provides filtering for the output voltage. Due to the mutual inductance of the transformer windings, a changing direct current component in the primary thereof will produce a direct current transient across the secondary windings. Since the changing direct current component is proportional both to displacement and rate of displacement, the transient direct current in the secondary will include both first and second time derivative components or an additional rate component and an acceleration component. The plates of tubes 41 and 42 are supplied with in-phase alternating potentials from the secondary winding 55 of transformer 30, and the amplifier stage is therefore sensitive to both alternating and direct current signals or voltages applied to the grids of the tubes thereof.

In a circuit of the foregoing character, the output thereof may be supplied directly to energize a motor and control the direction and rates of operation thereof. Furthermore, the fact that both the rate and acceleration components in the output of the amplifier circuit contribute to the stability of the follow-up system has been proven in practice. For example, if the plate and grid bias supply to the amplifier stage of the circuit alone were reversed, the direct current component in the output of transformer 24 would be reversed in sense while the alternating current output would not be changed in phase sense with respect to the error voltage. As a result, the degree of stability theretofore present is noticeably lacking.

Figure 2:
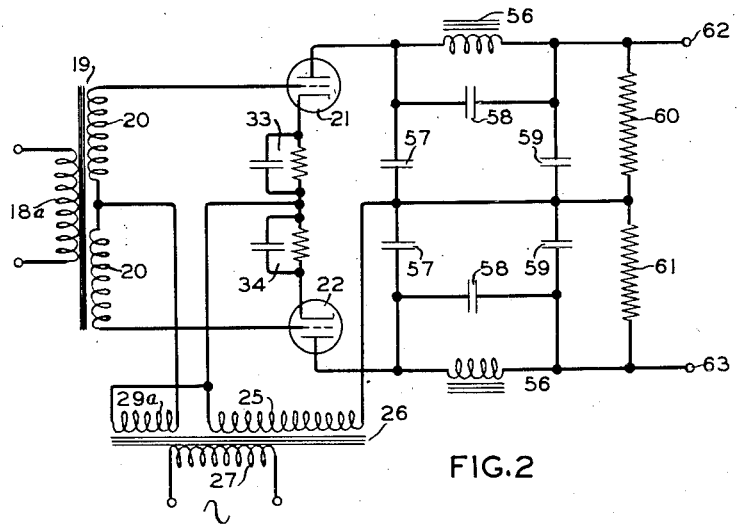
Fig. 2 is a wiring diagram of a modification thereof.

In Fig. 2 I have shown a modified form of control circuit which is designed to provide a direct current voltage output which includes components proportional to displacement and rate of displacement. The circuit is substantially the same as that portion of the circuit of Fig. 1 from the input transformer 19 to the electron tubes 21 and 22, and therefore the elements of the two circuits which conform to each other are provided with like reference characters. In other words, the alternating signal voltage which is derived from the signal transformer 1 is impressed across the single primary winding 18a of transformer 19, and the secondary windings 20 thereof are connected to the grids of tubes 21 and 22 as hereinbefore described. The plate potentials are derived from the secondary winding 25 of transformer 26 and grid bias potentials are derived from the secondary winding 26a, the primary 27 being connected across the source of alternating current such as that indicated at 9 in Fig. 1. The rate circuits 33 and 34, connected in the cathode circuits of the tubes, supply a first time derivative component or a rate component along with a displacement signal in the output of tubes 21 and 22.

Filter networks including chokes 56, and condensers 57, 58 and 59 are connected across the plates of the tubes 21 and 22 and in circuit with resistors 60 and 61. The filtering networks serve to by-pass the alternating current component of the plate outputs of the tubes whereby to impress a direct current voltage across the resistors 60 and 61 or across the output taps 62 and 63 of the circuit. It will be observed that in the circuit of Fig. 2 a direct current signal output, as compared to an alternating current signal, will be supplied across the output taps 62 and 63 but the output will include components proportional to the displacement error signal supplied to the transformer primary 18 and to the rate of change of error signal. This latter circuit is adapted to be employed in those types of servo or follow-up systems where it is desirable or most advantageous to employ direct current motors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control circuit of the character described adapted to supply an output voltage including components proportional to an input voltage and to a time derivative thereof, the combination with an alternating signal voltage generator for supplying a fixed frequency voltage proportional in amplitude to a measured variable, of a circuit including an electron tube including control electrode, plate and cathode tube elements and having the control electrode thereof electrically connected for control by the signal from said generator, output coupling means connected with the plate of said tube, delayed degerenation-producing means connected in series with said output coupling means, said delayed degeneration-producing means including resistance of the order of magnitude of the impedance of said coupling means and capacitance connected together in parallel whereby to provide a plate current output comprising components proportional to the signal voltage applied to said control electrode and to rate of change of said signal voltage.

2. In an amplifier circuit for controlling a motor in accordance with a signal voltage and the rate of change of amplitude of said signal voltage, the combination with an alternating signal voltage generator for supplying a fixed frequency voltage proportional in amplitude to a measured variable, of a circuit including a pair of electron tubes including control electrode, plate and cathode tube elements, said tubes having the control electrodes thereof electrically connected with said transformer in opposite phase sense, output coupling means, a resistance-capacitance network comprising resistance of sufficient magnitude as to provide degeneration for said tubes and capacitance in parallel therewith for delaying degeneration when a change in amplitude of the signal voltage input to said tubes occurs, said network being connected in series with said output coupling means in the cathode-plate circuit of each tube, means for supplying an alternating reference voltage to the plates of each tube, and means for amplifying the outputs of said tubes.

3. In an amplifier circuit for controlling a motor in accordance with a signal voltage and the rate of change of amplitude of said signal voltage, the combination with an alternating signal voltage generator for supplying a fixed frequency voltage proportional in amplitude to a measured variable, of a circuit including a pair of electron tubes including control electrode, plate and cathode tube elements, said tubes having the control electrodes thereof electrically connected for control by said signal voltage source in opposite phase sense, output coupling means, an impedance-reactance network comprising impedance of sufficient magnitude as to provide degeneration for said tubes and reactance for delaying degeneration when a change in amplitude of the signal voltage input to said tubes occurs, said network being connected in series with said output coupling means in the cathode-plate circuit of each tube, means for supplying an alternating reference voltage to the plates of each tube, transformer coupling means connected in the plate circuits of said tubes, means for proportioning the direct current component to the alternating current component fed from the plates to the primary of said transformer, there being induced in the secondary of said transformer a component due to changes in the direct current component fed to the primary thereof, and an amplifying stage including electron tubes having control electrode, plate and cathode tube elements, the control electrodes thereof being connected for energization from the secondary of said coupling transformer and the plates thereof being supplied with alternating voltages whereby the outputs thereof include first and second time derivative components.

4. In a control circuit of the character described adapted to supply an output voltage including components proportional to an input voltage and to a time derivative thereof, the combination with an alternating signal voltage generator for supplying a fixed frequency voltage proportional in amplitude to a measured variable, of a circuit including a pair of electron tubes each including control electrode, plate and cathode tube elements, means for supplying a signal voltage from said signal voltage generator to the control electrodes of said tubes in opposite phase sense, means comprising resistance and capacitance connected in parallel in the cathode circuit of each tube, said resistance being of sufficient magnitude as to provide degeneration for the tubes and the capacitance being sufficient to delay the degeneration whereby to provide plate current outputs including components proportional to the signal voltage applied to the control electrodes thereof and to rate of change of said signal voltages, and means for differentially varying the value of resistance in the cathode circuits of both tubes.

5. In a control circuit of the character described adapted to supply an output voltage including components proportional to an input voltage and to a time derivative thereof, the combination with an alternating signal voltage generator for supplying a fixed frequency voltage proportional in amplitude to a measured variable, of a circuit including an input connected to receive said signal voltage and output coupling means, an electron tube including control electrode, plate and cathode tube elements, said control electrode being connected with said input, delayed degeneration-producing means connected in series with said output coupling means in the plate-cathode circuit of said tube, said delayed degeneration-producing means including means for providing degeneration for said tube and means for delaying degeneration when a change in amplitude of the signal voltage input to the control electrode of said tube occurs, whereby the plate current output from said tube will comprise components proportional to the signal voltage applied to the control electrode thereof and to rate of change of said signal voltage.

6. In a control circuit of the character described adapted to supply an output voltage including components proportional to an input voltage and to a time derivative thereof, the combination with an alternating signal voltage generator for supplying a fixed frequency voltage proportional in amplitude to a measured variable, of a circuit including an input connected to receive said signal voltage and output coupling means, an electron tube including control electrode, plate and cathode tube elements, said control electrode being connected with said input, an impedance-reactance network for providing delayed degeneration for said tube, said network being connected in series with said output coupling means in the plate-cathode circuit of said tube, whereby the plate current output from said tube will comprise components proportional to the signal voltage applied to the control electrode thereof and to rate of change of said signal voltage.

7. In a control circuit of the character described adapted to supply an output voltage including components proportional to an input voltage and to a time derivative thereof, the combination with an alternating signal voltage generator for supplying a fixed frequency voltage proportional in amplitude to a measured variable, of a circuit including an input connected to receive said signal voltage and output coupling means, an electron tube including control electrode, plate and cathode tube elements, said control electrode being connected with said input, a resistance-capacitance network including resistance and capacitance connected together in parallel for providing delayed degeneration for said tube when a change in signal voltage input to the control electrode of said tube occurs, said network being connected in series with said output coupling means in the plate-cathode circuit of said tube, whereby the plate current output from said tube will comprise components proportional to the signal voltage applied to the control electrode thereof and to rate of change of said signal voltage.

8. In a control circuit adapted to supply an output voltage including components proportional to the input voltage and to a time derivative thereof, the combination with an alternating signal voltage generator for supplying a fixed frequency voltage proportional in amplitude to a measured variable, of a circuit including an input connected to receive said voltage and output coupling means, a pair of electron tubes each including control electrode, plate and cathode tube elements, the control electrodes of said tubes being connected in opposite polarity sense to said input, a resistance-capacitance network comprising resistance and capacitance connected together in parallel, and said network being connected in series with said output coupling means in the plate-cathode circuits of said tubes, said resistance being of sufficient magnitude as to provide degeneration for the tubes and the capacitance being sufficient to delay the degeneration, whereby to provide plate current outputs including components proportional to the signal voltage applied to the control electrodes thereof and to rate of change of said signal voltage.

RAWLEY D. McCOY.

REFERENCES CITED

The following references are of record in the file of this patent:

UNITED STATES PATENTS

| Number | Name | Date |
| --- | --- | --- |
| 2,068,490 | Hull | Jan. 19, 1937 |
| 2,184,576 | Beyerle | Dec. 26, 1939 |
| 2,208,623 | Bond | July 23, 1940 |
| 2,233,415 | Hull | Mar. 4, 1941 |
| 2,255,839 | Wilson | Sept. 16, 1941 |
| 2,324,797 | Norton | July 20, 1943 |
| 2,357,652 | Haynes | Sept. 5, 1944 |
| 2,381,155 | Frommer | Aug. 7, 1945 |
| 2,401,939 | Labin | June 11, 1946 |